United States Patent [19]  [11] 4,169,218
Tyler  [45] Sep. 25, 1979

[54] FLAT PANEL TELEPHONE STATION SET

[75] Inventor: Daniel W. Tyler, Middletown, N.J.

[73] Assignee: Bell Telephone Laboratories, Incorporated, Murray Hill, N.J.

[21] Appl. No.: 929,449

[22] Filed: Jul. 31, 1978

[51] Int. Cl.$^2$ .............................................. H04M 1/02
[52] U.S. Cl. ........................... 179/100 R; 179/1 VE;
 179/146 R; 179/179
[58] Field of Search ................... 179/1 VE, 29, 41 A,
 179/100 R, 100 C, 100 D, 146 R, 147, 178, 179;
 325/16, 111, 117

[56]  References Cited
 U.S. PATENT DOCUMENTS

| 3,009,023 | 11/1961 | Ruth | 179/100 R |
| 3,167,617 | 1/1965 | Gerhardt | 179/100 D |
| 3,344,236 | 9/1967 | Chipping | 179/29 |
| 3,546,396 | 12/1970 | Marcheschi et al. | 179/178 |
| 4,056,696 | 11/1977 | Meyerle et al. | 179/100 R |

FOREIGN PATENT DOCUMENTS 1400788 7/1975 United Kingdom ................ 179/146 R Primary Examiner—Bernard Konick
Assistant Examiner—Randall P. Myers
Attorney, Agent, or Firm—John Francis Moran

[57]  ABSTRACT

A telephone station set has subscriber-interface elements associated with rotatable panel (11). Rotatable panel (11) is adapted to serve as a sunshade visor in an automobile. In panel (11), exterior cavity (14) readily accommodates handset (16) in either of two hangup positions. Handset (16) is compact and nonsymmetrical while the interior of cavity (14) completely contains the handset in either of the hangup positions. This arrangement provides the convenience of one handed operation by either hand of an operator. Coiled handset cord (27) emerges from a centrally located port (28) to provide the electrical connection compatible with this convenient operation.

4 Claims, 3 Drawing Figures

FLAT PANEL TELEPHONE STATION SET

CROSS REFERENCE TO RELATED APPLICATION

Concurrently filed with this application there is a design patent application Ser. No. D 929,434, filed July 31, 1978, also of D. W. Tyler (Case 10) and of common assignee entitled "Design for a Telephone Station Handset."

BACKGROUND OF THE INVENTION

1. Field of the Invention

This invention relates to telephone control units, or subscriber station sets, and it relates particularly to such units for radio telephone systems.

2. Prior Art

In mobile radio and telephone systems, the control unit for a mobile radio unit contains the station set elements required for interfacing the radio telephone with a subscriber. One location for such a control unit is in the sun visor of an automobile. A control unit of this type is disclosed in U.S. Pat. No. 4,056,696 issued to J. A. Meyerle et al on Nov. 1, 1977. Such a design is relatively free of the vagarities of automobile model style changes since sun visors are standard equipment. Another advantage of the location is convenience to the driver by providing the capability of operating the unit with little distraction. For these reasons, this approach has the potential of becoming a standardized location.

In the Meyerle et al patent, two models are disclosed which provide recesses each for an individual compact handset. In one model, the handset features a telescoping bridge portion urged to extend by a spring while the visor panel has a vertically oriented recess. This arrangement has the advantage of equal facility of use for either hand, but human factor studies indicate that acceptance of such a handset may present problems. In the other model, a handset of fixed size and an enlarged recess rotated 90° which extends horizontally are utilized. However, such a handset has only one hang up position that may be accessed by either an underhand right grip or an overhand left grip. It would be highly desirable if the latter arrangement provided equal ease of use for either hand while avoiding the potential problem of the telescoping handset.

It is an object of this invention to provide a longitudinally oriented exterior cavity in an automobile sunshade visor which accepts handset equally well in either of two positions.

Another object is to provide a handset cord arrangement which facilitates the two different hang up positions of a handset within the body of an automobile sunshade visor.

SUMMARY OF THE INVENTION

The invention utilizes a rotatable panel member having a recess or an interior cavity with a centrally located protruding portion and lateral portions either of which may accept the larger end portion of a handset and completely contain same so that the handset may be placed therein or removed therefrom with respect to either of two different positions for use by either hand of an operator. A handset cord emerges from a centrally located port to the side of the cavity to provide an arrangement compatible with the dual positioning of the handset. The handset cord is a coiled cord and an interior longitudinal cavity communicates with the port to provide a reservoir for the handset cord.

The invention including its features, advantages and further objects, will be fully understood from a reading of the description to follow of an illustrative embodiment.

DETAILED DESCRIPTION

The invention is illustrated by way of its application to the environment represented by an automobile sunshade visor. It is also pointed out and to be understood that the invention is highly useful in other swivel panel applications. A mobile radio telephone system of the high capacity cellular type such as that disclosed in U.S. Pat. No. 3,663,762 issued to A. E. Joel on May 16, 1972 is one in which the invention may be used to advantage.

Figure 1:
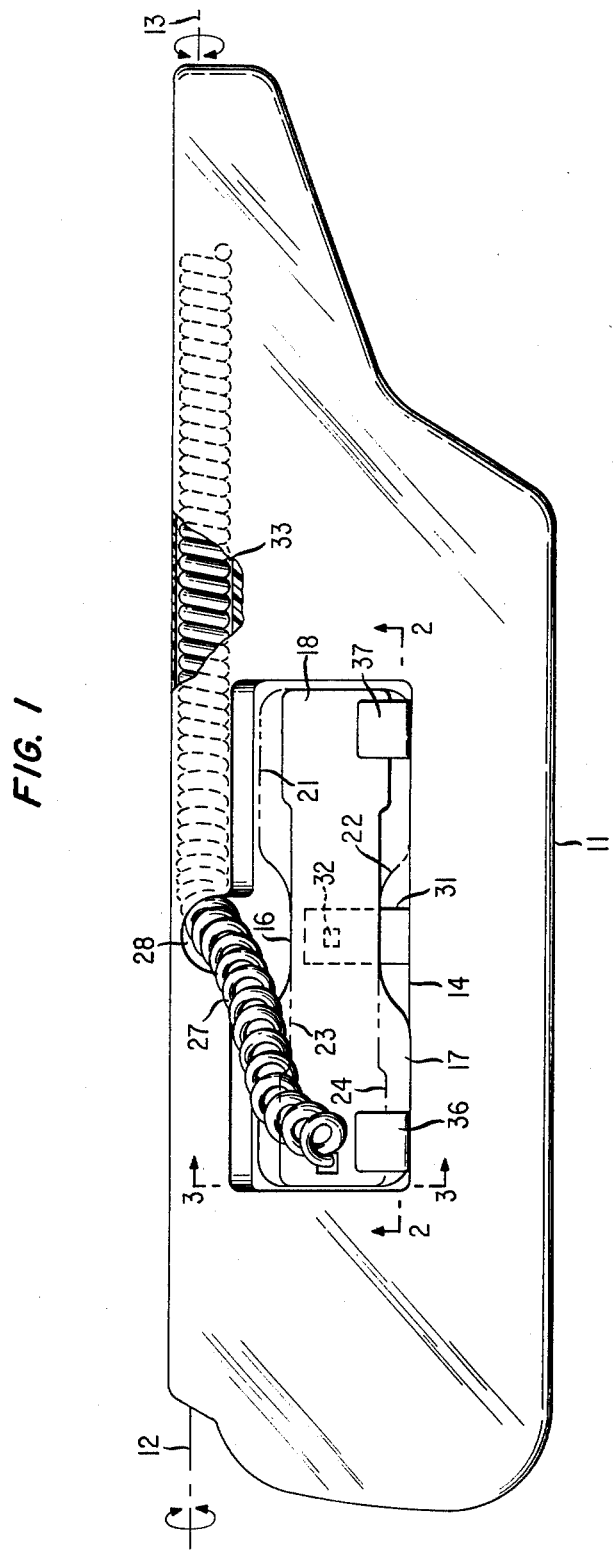
FIG. 1 is an arrangement suitable for a radio telephone control unit.

In FIG. 1, sun visor 11 is depicted as being mounted for rotation about axis 12, 13. Visor 11 may concurrently be pivoted for cantilevered rotation or swiveling in an orthogonal axis from the vicinity of 12, which is normally located above the upper left hand corner of the windshield of an automobile. Since arrangements for providing this type of adjustable mounting for sun visors are well known, such an arrangement is not shown in FIG. 1 for the sake of clarity. Also not shown is the presence of a cable which enters sun visor 11 in the vicinity of 12 to provide a multiconductor connection between the control unit and the remaining elements of the radio telephone unit. Typically, visor 11 will include (not shown) pushbutton switches in the form of a convenient keyboard, a speaker and adjustable knobs.

Advantageously located in the center portion of visor 11 is interior cavity 14 wherein handset 16 is present. A principal feature of cavity 14 is that handset 16 may be readily accommodated in either of two positions. This ambidextrous arrangement provides equal convenience and facility of use for single-handed manipulation by either hand of an operator. It should be pointed out that handset 16 does not have end-to-end symmetry since receiver end 17 is larger than transmitter end 18. Phantom lines 21-24 provide an indication of the presence of handset 16 in cavity 14 in the other position during which the position of handset cord 27 will naturally lie to the right of port 28.

In the center region of recess 14 is ridge 31. When handset 16 is in cavity 14, the bridge of the handset spans over ridge 31. Ridge 31 includes hookswitch 32 to detect the presence of handset 16 in cavity 14.

Clips or tabs 36 and 37 present in the lower corners of recess 14 keep handset 16 in recess 14. Opposing forces produced by hookswitch 32 and clips 36 and 37 are adjusted so that the hookswitch detects the presence of handset 16 in recess 14. This arrangement also provides a stable and secure resting place for handset 16 while in recess 14.

Handset cord 27 is a coiled cord also known as a retractile cord. Cord 27 naturally assumes a tight helical spiral in the nonextended or retracted state. In visor 11, interior longitudinal cavity 33 serves as a reservoir for cord 27 when handset 16 is in cavity or recess 14.

Figure 2:
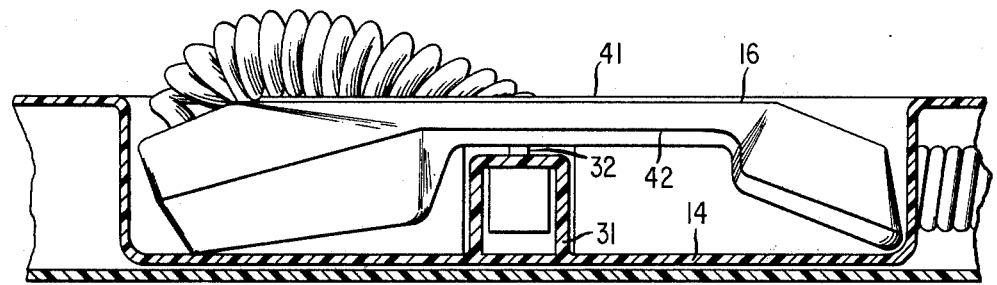
FIG. 2 is one cross-sectional view illustrating the relationship between the handset and an exterior cavity associated with the panel member of FIG. 1.

FIG. 2 is a cross-sectional view along centerline 2—2 of FIG. 1 which illustrates the physical relationship between handset 16 and recess 14. It should be noted that the same reference numerals in FIG. 2 are utilized to identify different views of like components illustrated in FIG. 1. The relative positions of ridge 31 and hookswitch 32 to that of the bridge portion of handset 16 are more clearly illustrated in FIG. 2. It should also be further evident from this view that the interior volume and shape of cavity 14 is related to the overall form of handset 14. More specifically, the interior dimensions of cavity 14 should be sufficient to accommodate receiver end 17 of handset 16 on either side of ridge 31. The depth of cavity 14 should also be sufficient so that when handset 16 is fully inserted therein the rear of its bridge portion is substantially coplanar with the plane of surface 41.

Figure 3:
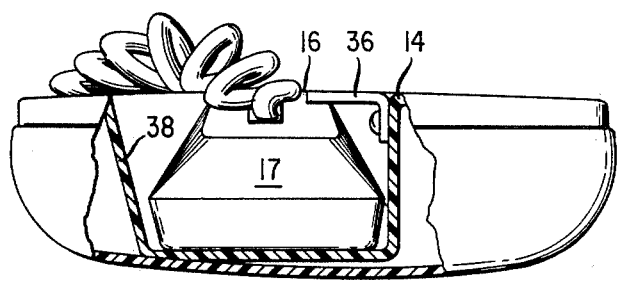
FIG. 3 is another cross-sectional view from the side of the exterior cavity containing the handset as illustrated in FIG. 1.

FIG. 3 is a cross-sectional end view of recess 14 from centerline 3—3. In this view, receiver end 17 of handset 16 is shown within recess 14. Against the back of handset 16 is clip 36 which provides the counterpressure to hookswitch 32 (not shown). Clearly illustrated in FIG. 3 is the slope of wall 38 in cavity 14 to provide ample clearance for convenient insertion or removal of handset 16 with respect to the cavity.

As is evident from FIGS. 1, 2 and 3, handset 16 is of small size and therefore low weight as compared to those usually found in fixed station subscriber sets. Transmitter end 18 includes an electret, or other small lightweight, microphone instead of the rather bulky and heavy typical carbon transmitter of standard handsets. A feature of the electret microphone and associated circuitry is that the distance between it and the mouth of an operator are not critical allowing handset 16 to be shorter than the usual telephone handset. Receiver end 17 has handset cord 27 for convenience and safety purposes. With cord 27 emerging from the earpiece of handset 17, it normally lies outside the field of vision of an automobile driver when extending from receiver end 17 to visor 11 located above the driver.

Handset 16 may be conveniently constructed of two molded shells which meet and form seam 42 depicted in FIG. 2. One suitable material for the molding of handset 16 is CYCOLAC ABS plastic which provides excellent stain resistance, high impact strength, color availability, and capability of being formed by a variety of methods including cold forming. The material of visor 11 may be any one of the well-known plastic materials including thermoplastic material. Those skilled in the art may desire also to add protective impact absorbent material to the side of visor 11 opposite that of cavity 14 for safety purposes.

It should be also pointed out that other arrangements may be utilized instead of tabs 36 and 37 to secure handset 16 in recess 14. Some equivalent techniques include, for example, the use of a restraining strap or the use of elastic cushioning at opposite ends of cavity 14 for frictionally engaging handset 16. Restraining force for securing handset 16 may be also provided by appropriate use of magnets and magnetic material in the handset and cavity 14.

It is to be understood that the embodiment described herein is merely illustrative of the principles of the invention. For example, the handset may take on different forms to suit other applications and the cavity dimensions and shape will vary accordingly. Various other modifications may be also made by persons skilled in the art without departing from the spirit and scope of the invention.

I claim:

1. A telephone station set adapted to be operated by a user in at least one predetermined position, said set comprising
    a rotatable panel member (11) having first and second oppositely disposed faces and mounted for rotation between a first position wherein the first face is substantially concealed from view from said user and a second position wherein the first face is in full view of said user,
    a handset (16) having a transmitter end portion (18) and a receiver end portion (17) connected by a bridge, one of the portions is substantially larger in size than the other portion making said handset nonsymmetrically proportioned,
    characterized in that said panel member has an interior cavity (14) communicating with said first face for receiving the handset in either of two predetermined positions, the first predetermined position locates the transmitter end portion near a first end wall of said cavity and the second predetermined position locates the transmitter end portion near a second end wall of said cavity that is longitudinally opposite said first end wall,
    retaining means (36 and 37) associated with the cavity for holding the handset therein, and
    a protruding portion (31) located in said cavity includes means for sensing (32) the presence of the handset in said cavity, the cavity having said first and second end walls being disposed laterally and in opposite directions from the protruding portion and each portion of said cavity including one of the end walls capable of containing the larger of the end portions of the handset.

2. A telephone station set according to claim 1 further comprising
    a handset cord (27) for electrically connecting the handset to the rotatable panel member, the handset cord emerging from a port (28) located midway along one side of the cavity (14) extending between said first and second end walls.

3. A telephone station set according to claim 2 wherein the handset cord is a coiled cord and the rotatable panel member has an interior longitudinal cavity (33) communicating with the port to provide a reservoir for the handset cord.

4. A telephone station set according to claim 3 wherein the retaining means comprises two tabs (36 and 37) each located at opposite ends of the side of the cavity (14) and the opposite side (38) of the cavity (14) is sloped to provide an exterior width of the cavity (14) larger than the interior width at its base.

* * * * *